May 15, 1945.　　　　　G. BOUYOUCOS　　　　　2,375,892

THERMOMETER

Filed May 13, 1943

INVENTOR.
GEORGE BOUYOUCOS
BY
Carroll R. Jaber

Patented May 15, 1945

2,375,892

UNITED STATES PATENT OFFICE 2,375,892

THERMOMETER

George Bouyoucos, East Lansing, Mich., assignor to Michigan State Board of Agriculture, East Lansing, Mich., a corporation of Michigan Application May 13, 1943, Serial No. 486,837

5 Claims. (Cl. 201—63)

This invention relates to temperature measuring apparatus, and particularly to thermometers or pyrometers of the so called resistance type.

Resistance thermometers used heretofore have employed a metallic conductor in the form of a wire which varies in electrical conductivity or resistance as its temperature varies. By exposing the wire to heat from a substance, the temperature of which is to be measured, and measuring the electrical resistance of the wire, the temperature of the substance can be determined. The change of resistance per degree change in temperature is very small however, so to accurately determine small variations in temperature, exceptionally accurate, and therefore expensive, resistance measuring devices must be employed.

For instance, the most common form of resistance thermometer employs a platinum wire as the electrical conductor whose resistance is measured to determine temperature. A platinum wire having a resistance of 20 ohms at 32° F. has a resistance of 27.7 ohms at 212° F., a variation of but 7.7 ohms for 180° F. temperature variation. Thus, to read to a one degree temperature change requires a resistance measuring device capable of measuring to .043 ohm, while to read fractions of a degree requires even greater accuracy. Such instruments are delicate and expensive.

I have discovered that solutions of certain electrically conductive liquids have a very wide variation in resistance per degree change in temperature, and that within reasonable temperature ranges can be made to read temperatures exceptionally accurately with relatively inexpensive resistance measuring devices.

Accordingly, it is an object of the present invention to provide a resistance thermometer which is exceptionally accurate but relatively inexpensive.

Another object is to provide a resistance thermometer of simple construction employing a liquid resistance.

These objects will more fully appear in the following specification when read in connection with the accompanying drawing, wherein—

Figure 1:
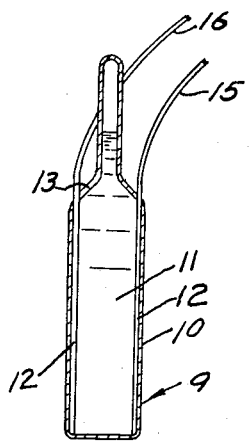
Figure 1 is a cross-sectional view of the electrical resistance element.

Briefly, the resistance element 9 disclosed in Figure 1 consists of a container 10, two electrodes 12, and an electrical conductor or resistance as it may be termed also, in liquid form 11.

The container may be of glass or other suitable liquid tight insulating material.

The container is filled nearly to the top with the liquid conductor 11. The liquid should extend up into the neck of the container above the shoulder 13 of the latter. The conductor is for the most part pure glycerine. The electrical resistance of glycerine, however, is too great to be measured with practical measuring devices so it is mixed with another and better conductor, such as water or ethylene glycol. For most purposes an 85% solution of glycerine and water or a 50% solution of glycerine and ethylene glycol give best results. Pure ethylene glycol is satisfactory also.

The two electrodes 12 are preferably platinum wires. They extend into the container through the shoulder 13 on opposite sides of the container. They are sealed by heat into the shoulder 13 of the container. The electrodes 12 are in parallel relation, and are wholly immersed in the solution, so that expansion and contraction of the liquid will not cause the length of wire immersed in the liquid to vary. In order that the electrodes may be exactly the same distances apart in all thermometers they can be anchored against the wall of the tube having a uniform boring.

The neck of the container is closed so as to hermetically seal the same, preferably by fusing the glass.

Figure 2:
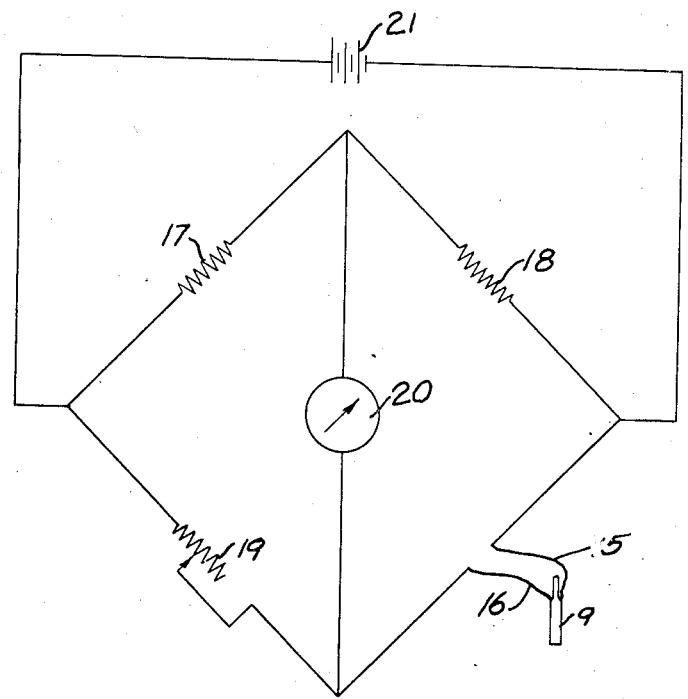
Figure 2 is a diagram showing the connection of the resistance with a Wheatstone bridge.

The resistance element 19 is connected to a resistance measuring apparatus by means of leads 15 and 16 attached to the two electrodes 12. The resistance measuring device may be of any well known type, such as the Wheatstone bridge shown in Figure 2. The bridge comprises two fixed resistances 17 and 18 of known value, a variable resistance 19, and a galvanometer 20. A battery 21 or other suitable source of electric current is connected across the bridge.

The resistance 19 is calibrated in ohms or it may be provided with a dial calibrated to read temperature directly in degrees. Since the fixed resistances 17 and 18 are known and the resistance of 19 for any setting can be determined, the resistance of the resistance element 9 can be determined at any time in the usual manner of determining a known resistance by means of a Wheatstone bridge, or other resistance measuring device, as the case may be.

The resistance element can be calibrated by immersing it in liquids which maintain definite temperatures at known pressures, such as melting ice, boiling water, etc., and determining the resistance at those temperatures. By determining a number of such values a curve can be plotted from which any unknown temperature can be found. It is necessary only to permit the resistance element to reach the temperature of the unknown substance, find the resistance at that temperature, and then find the corresponding temperature on the curve.

It will be evident to a person skilled in the art that there are a number of variable factors in the structure disclosed, any change of which will vary the resistance of the resistance element. Increasing the distance between the electrodes 12 will cause an increase in resistance of the element while decreasing the distance between them will cause a corresponding decrease in the resistance. Increasing the lengths of the electrodes that are immersed in the liquid will decrease the resistance, and vice versa. Also, if the liquid conductor 11 is composed of two liquids of different conductivity, increasing the proportion of the liquid of greater conductivity will lower the resistance of the mixture, while an increase in the proportion of the liquid of less conductivity will increase the resistance of the mixture.

A specific example of the invention which has produced excellent results within normal temperature ranges, that is, between 32° and 212° F. is as follows:

The container 10 is a glass tube 25 millimeters long from the bottom to the shoulders 13 and 8 millimeters in diameter. The neck is 2.5 millimeters in diameter and 15 millimeters long. The lower, and wider portion of the tube is carefully made so that its diameter is uniform throughout. The electrodes 12 are platinum wires of No. 24 gauge anchored against opposite walls of the tube and extending from the shoulders 13 to the bottom of the tube.

The liquid conductor 11 is a mixture of 50% glycerine and 50% ethylene glycol. Enough of it is poured into the container so that it extends well up into the neck thereof, completely immersing the electrodes.

This resistance element has a resistance value at the temperatures indicated, as follows:

| Temperature | Resistance |
| --- | --- |
|  | Ohms |
| 32° F | 2,110,000 |
| 53.5° F | 730,000 |
| 76.5° F | 299,500 |
| 101° F | 135,000 |
| 129° F | 68,000 |
| 150° F | 45,000 |

If temperatures below 32° F. are to be measured, the resistance of the glycerine solution should be reduced by decreasing the percentage of glycerine. Otherwise, the resistance of the solution rises so high that the resistance 19 in the Wheatstone bridge must be so great as to be impracticable. Proper proportions for different ranges can best be determined by experiment.

It will be seen from the foregoing that the present invention forms a simple, inexpensive and very accurate resistance thermometer, which may be easily made and calibrated. Its extreme accuracy is due to the wide variation in its resistance per degree change in temperature.

The scope of the invention is indicated in the appended claims.

I claim:

1. An electrical resistance thermometer comprising an electrically non-conductive heat conducting container, an electrically conductive non-electrolytic liquid in said container adapted to vary in electrical conductivity in accordance with variations in the temperature thereof, and a pair of spaced apart electrodes having portions thereof within said container, the said portions of the electrodes being wholly immersed in said liquid and adapted to constitute a portion of means for passing a current of electricity through said liquid.

2. An electrical resistance thermometer as defined in claim 1 wherein said liquid comprises glycerine.

3. An electrical resistance thermometer as defined in claim 1 wherein said liquid comprises ethylene glycol.

4. An electrical resistance thermometer as defined in claim 1 wherein said liquid comprises ethylene glycol and glycerine.

5. An electrical resistance thermometer comprising an electrically non-conductive heat conducting container, said container being of elongated tubular form, an electrically conductive liquid substantially filling said container and adapted to vary in electrical conductivity in accordance with variations in the temperature thereof, and a pair of electrodes having portions thereof within said container in spaced apart parallel relation to each other, the said portions paralleling the axis of said tubular container and being wholly immersed in said liquid, said electrodes being adapted to constitute a portion of means for passing a current of electricity through said liquid.

GEORGE BOUYOUCOS.